United States Patent [19]
Sadler

[11] Patent Number: 4,951,960
[45] Date of Patent: Aug. 28, 1990

[54] SNOWBOARD

[76] Inventor: Stanley Sadler, Acregate, Kippen, Stirling, FK8 3EF, Scotland

[21] Appl. No.: 156,316

[22] Filed: Feb. 16, 1988

[30] Foreign Application Priority Data

Feb. 18, 1987 [GB] United Kingdom ............... 8703801

[51] Int. Cl.$^5$ ...................... A63C 5/03; A63C 5/048
[52] U.S. Cl. .................... 280/607; 280/609; 280/606; 280/14.2; 280/15; 441/65
[58] Field of Search ............ 280/606, 607, 608, 609, 280/12 H, 12 F, 12 A, 818, 14.1, 14.2, 14.3, 900, 15; 441/65 X, 72, 73

[56] References Cited

U.S. PATENT DOCUMENTS

| 2,510,794 | 6/1950 | Beerli | 280/609 |
| 2,841,805 | 7/1958 | Roudebush | 441/73 |
| 3,154,312 | 10/1964 | Marchand | 280/14.2 |
| 3,264,663 | 8/1966 | Owens | 280/818 X |
| 3,378,275 | 4/1968 | Rockwood et al. | 280/606 X |
| 3,585,664 | 6/1971 | Thompson | 441/73 |
| 3,854,739 | 12/1974 | Toda et al. | 280/606 |
| 4,305,603 | 12/1981 | Muller et al. | 280/14.2 X |
| 4,678,445 | 7/1987 | Monreal | 441/72 |

FOREIGN PATENT DOCUMENTS

| 99664 | 2/1984 | European Pat. Off. | |
| 154310 | 9/1985 | European Pat. Off. | |
| 2013764 | 10/1971 | Fed. Rep. of Germany | 280/12 H |
| 2383679 | 10/1978 | France | |
| 2435956 | 4/1980 | France | |
| 2437850 | 4/1980 | France | |
| 2521864A | 8/1983 | France | 280/12 H |
| 2581322 | 11/1986 | France | 280/12 H |
| 583046 | 12/1976 | Switzerland | 280/12 H |
| 2043461B | 12/1982 | United Kingdom | |

Primary Examiner—Charles A. Marmor
Assistant Examiner—Tamara L. Finlay
Attorney, Agent, or Firm—Kareem M. Irfan

[57] ABSTRACT

The present invention relates to a board 1 suitable for use in descending a snow slope. The board 1 has a generally flat elongate base 15, a forward portion 2 with an upturned leading edge portion 12, a user support portion 4 and a rearward portion 3 comprising at least partly independently movable left and right support portions 18, 19 extending generally alongside each other rearwardly from said forward portion 2.

The base 15 has outer side edges 7, 8 of generally angular cross-sectional shape for biting into the surface of a snow slope during turning in use of the board 1. The side edges are furthermore concavely arcuate, in plan view, so that the board 1 is substantially waisted intermediate its ends 12 and 14 so that the board can proceed along an arcuate path when one of its side edges 8 is weighted and the other 7 unweighted.

20 Claims, 2 Drawing Sheets

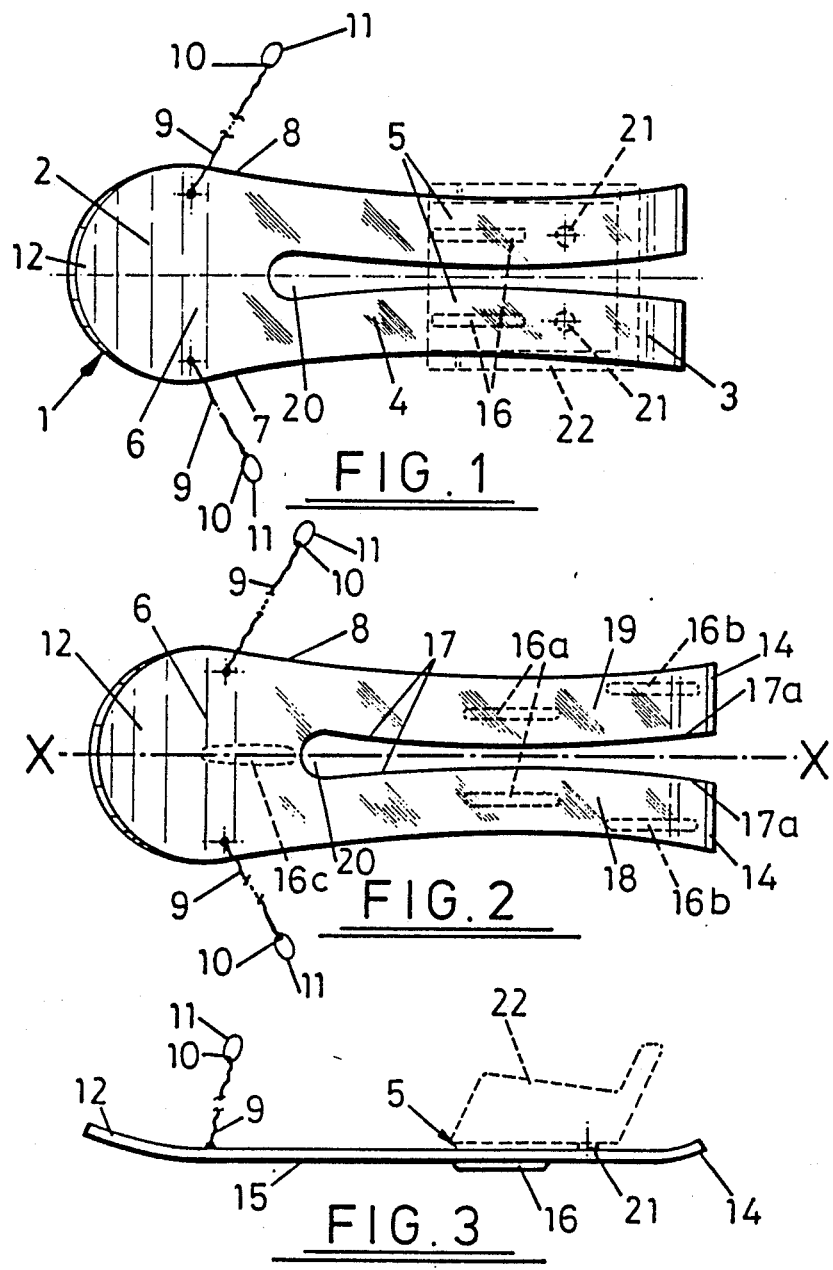

SNOWBOARD

The present invention relates to a snow board suitable for use in descending a snow slope.

Various means are known for descending snow slopes such as toboggans, skis and monoskis. The latter whilst permitting a high degree of control and excitement to the user require a considerable degree of skill whilst the former although less demanding are more restricted in their appeal and potential.

It is an object of the present invention to avoid or minimise one or more of the above disadvantages.

The present invention provides, a board suitable for use in descending a snow slope which board has a generally flat elongate base, a forward portion with an upturned leading edge portion, a user support portion, and a rearward portion with said user support and rearward portions being divided into at least partly independently movable left and right support portions extending generally alongside each other rearwardly from said forward portion, said base having opposed side edges of generally angular cross-sectional shape for biting into the surface of said snow slope during turning in use of said board, said side edges being concavely arcuate, in plan view, so that said board is substantially waisted intermediate its ends whereby in use, said board can proceed along an arcuate path when one of said side edges is weighted and the other unweighted.

The user support portion may be of any suitable form and may for example be adapted to support a standing or crouching user, optionally with some foot engagement means such as for example foot loops, foot stops or foot bindings. The user support could also be formed and arranged so as to support a seated user there being provided a suitable raised seat. In this case the user support means would desirably also include a foot support portion forward of the seat.

Preferably a rearward portion of a snow board of the invention has at least partly independently movable left and right support portions extending generally alongside each other, rearwardly from the front portion, with the left and right support portions being formed and arranged with sufficient torsional flexibility to allow a small degree of twisting about their longitudinal axis relative to their normal disposition in the principal plane of the the unweighted board. This form of the invention generally allows a high degree of directional control and/or greater ease of use than monoskis. Desirably the left and right support portions have opposed inner side edge sections which diverge rearwardly at the rearward portion of the board so as to each extend generally parallel to the respective remote outer side edge section at the forward portion of the board so that when said side edge section is weighted for turning, and the respective inner side edge section at the same time also bites into the snow (See FIG. 5) as a result of the user's natural weight distribution on the board, the engaged side edge sections co-operate to drive the board in a substantially similar direction. Where turning performance is less important, the degree of divergence between the opposed inner side edge sections may be reduced or even eliminated so that they are substantially parallel to each other.

Advantageously the board is provided with steering means comprising handle means linked to opposed left and right hand side portions of said forward portion of the board by elongate connectors formed and arranged so as to be manipulable by a user selectively to apply a generally upward force to one or other of the said side portions.

Thus the snow boards of the present invention provide an attractive new way of descending a snow slope.

Further preferred features and advantages of the present invention will appear from the following detailed description given by way of example of some preferred embodiments illustrated with reference to the accompanying drawings in which.

Figure 1:
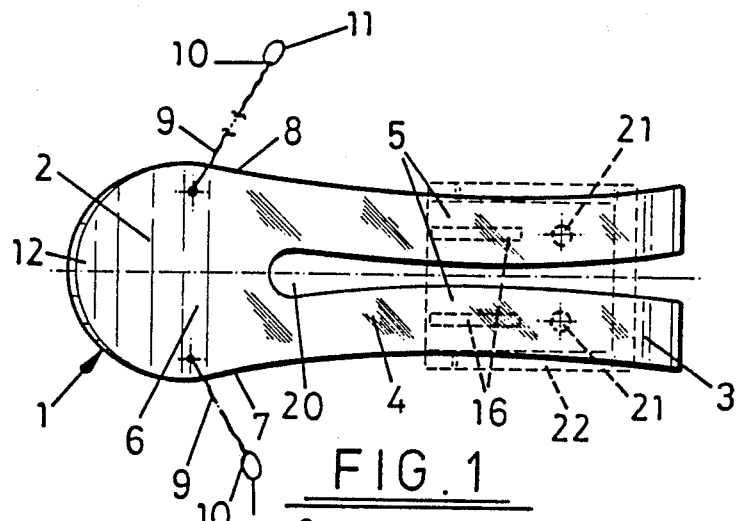
FIG. 1 is a plan view of a snow board of the invention.

FIG. 1 shows a snow board 1 having an upwardly curving and tapering front end portion 2, a rear end portion 3 and a user support portion 4 having a foot support surface 5 on which a user stands with his two feet in use of the board. At the rear end 6 of the front end portion 2 are secured adjacent opposite edges 7, 8 two flexible elongate connectors 9 at the distal ends 10 of which are provided respective independent handle means in the form of loops 11 which can be held by a user standing generally erect on the foot support surface 5.

Figure 3:
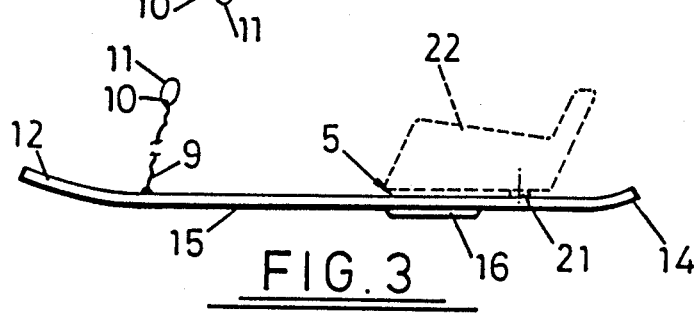
FIG. 3 is a side elevation of the board of FIG. 1.
Figure 4:
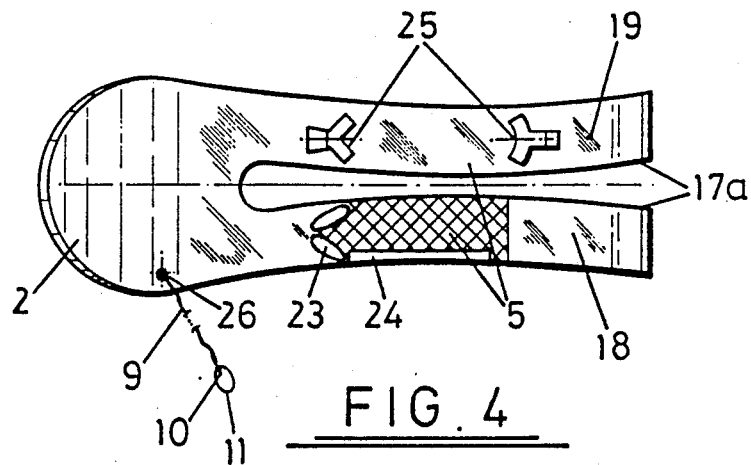
Figure 5:
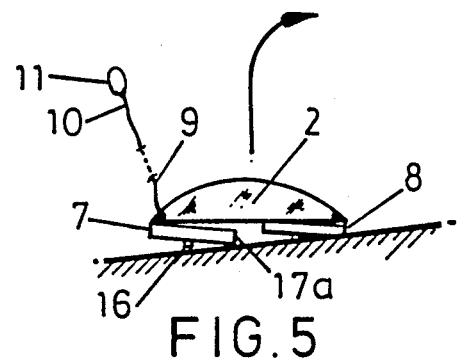
Figure 6:
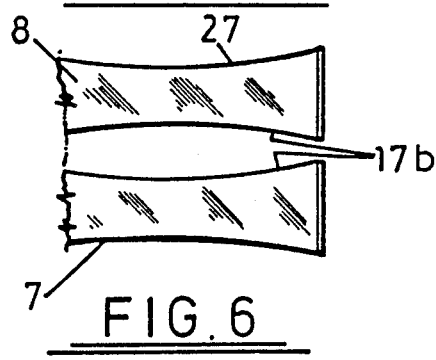

As may be seen in more detail in FIG. 3, although this embodiment of the board is relatively short and broad, it does nevertheless share certain characteristics with the field of ski construction. Thus the front end portion terminates in a tip 12 having some similarities with the tip of a ski. In addition the side edges 7, 8 are substantially waisted i.e. have a significant degree of side cut.

In more detail the outer side edges are generally arcuate with a radius of curvature of the order of from 1 to 12 times, preferably from 3 to 6 times the length of the board, for example about 4 times the length of the board. In general the length of the board and the waisting or curvature of the outer side edges, are dimensioned so as to permit execution of turns on a snow slope of a short to medium radius by suitable weighting of one side or the other of the board, whilst maintaining a sufficient width of the board at the user support portion to accommodate the user's feet. The rear end portion 3 moreover is slightly upturned at its tail end 14 somewhat similarly to the tail of a ski (see FIG. 3).

Figure 2:
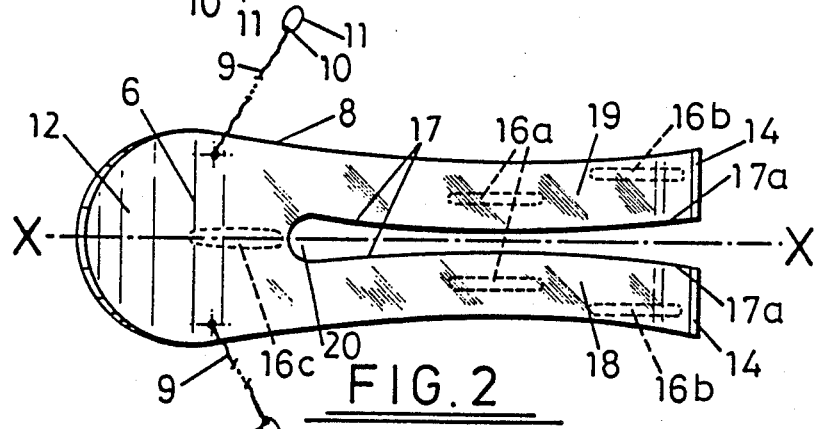
FIG. 2 is a corresponding view of a similar embodiment.

As may be seen in FIGS. 1 and 2 the rear and user support portions 3, 4 of the board are divided into left and right elongate support portions 18, 19 extending generally alongside each other rearwardly from the forward portion 2 and defining therebetween an elongate longitudinally extending slot 20. The left and right portions are formed integrally with the forward portion and have a limited degree of movement independently of each other both up and down and by twisting out of the principal plane of the board (see FIG. 5). As shown in FIG. 2 the opposed inner side edges 17 of the left and right support portions 18, 19 diverge at the rearward portion 3 of the board so as to each extend generally parallel to the respective waisted outer side edge 7 or 8 at the remote side of the forward portion 3 of the board so that as the outer side edge of one support portion is weighted and bites into the snow surface and the other support portion outer side edge unweighted, the inner side edge rear end 17a of said other support portion which also bites into the snow (See FIG. 5) can follow readily a path in a generally similar direction to that followed by the weighted outer side edge.

The board may be made of any suitable material such as for example wood or plastics material formed into the required shape. If desired the board may moreover be of a laminated construction including if desired metal elements such as for example metal edges along the outer side edges, 7, 8 of the board at the underside 15 of the board, though this is not essential.

The foot support surface 5 is desirably formed and arranged so as to have non-slip properties being provided with suitable formations such as upwardly projecting rib or mesh formations and/or being of a non-slip material such as rubber.

The underside 15 of the board will generally be of a substantially smooth plane material and does not require grooves or channels as are found on most skis, though short longitudinally extending shallow ribs 16 (See FIGS. 1 and 2) may be provided centrally 16a of each support portion 18, 19 at the user support portion 4 under a user's feet, or at 16b the rearward portion 3 of the board. A rib 16c may also be provided on the centre line X—X of the board immediately in front of the slot 20 separating the left and right user support portions 18, 19 to help resist lateral sliding of the board. The ribs may conveniently have a length of the order of 5 to 25 cm e.g. 15 cm and a width of the order of a few millimetres e.g. 2 to 4 mm. and a depth of up to perhaps 5 or 15 mm. in the case of the rearward portion ribs 16b, so that when an outer side edge is weighted, they are raised up to have little or no influence on the turning of the board.

Figure 5:
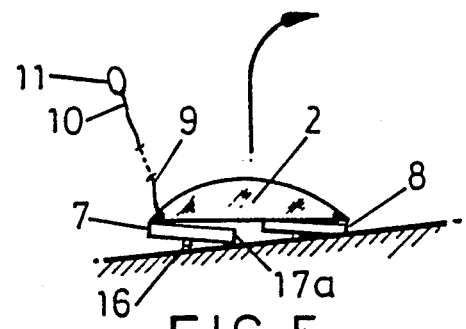
FIG. 5 is a rear elevation of the board of FIG. 1 illustrating its mode of operation.

In use of the board of the invention the user stands on the support surface 5 facing generally forwardly and holds the handle loops 11 in respective ones of his left and right hands. Steering may then be simply achieved by pulling on the handle 11 opposite the intended direction of turn thereby unweighting that side edge 7 and causing the other side edge 8 adjacent the turning direction to carve a curve in the snow as shown in FIG. 5.

The board of the invention may be of any suitable size depending on the size of the user.

In general a board suitable for use by a small child would have a maximum width in the region of 200 to 340 mm. e.g. 280 mm. and an overall length of 800 to 1,200 mm. e.g. 1,000 mm. whilst a board suitable for use by an adult or large child would have a maximum width in the region of 280 to 400 mm. e.g. 330 mm. an overall length of some 950 to 2,000 mm., preferably 1,000 to 1,500 mm, e.g. 1,190 mm. The degree of waisting of the outer side edges in terms of the extent of indentation at each side from the maximum width of the board is generally in the region of from 5 to 60 mm, preferably 15–50 mm. depending inter alia on e.g. the length of the board, —greater flexibility requiring less waisting or indentation in order to achieve the same radius of turn in use of the board.

If desired the board 1 can be provided at its rear end portion 3 with releasable location or securing means such as a spigot or socket means 21 for mounting of a removable seat 22 (shown in dashed outline (See FIGS. 1 and 3) in order also to permit use of the board as a simple sledge. Naturally where a relatively rigid seat and mounting are provided, this will to some extent limit the freedom of movement of the left and right portions 18, 19 relative to each other. If desired though there could be provided a flexible seat and/or mounting therefor, in order to maximize freedom of movement of the left and right portions 18, 19.

As shown in FIG. 5, when a user pulls upwardly on the left handle 11 the user's weight tends to press down on the right hand side edge 8 of the board biting through the snow and thereby causing the board to follow an arcuate path. As may be seen in FIG. 5, the outer opposed side edges 7, 8 of the board are generally angular and substantially square in cross sectional shape in order to maximize grip and biting in the snow and hence control of turning.

Figure 4:
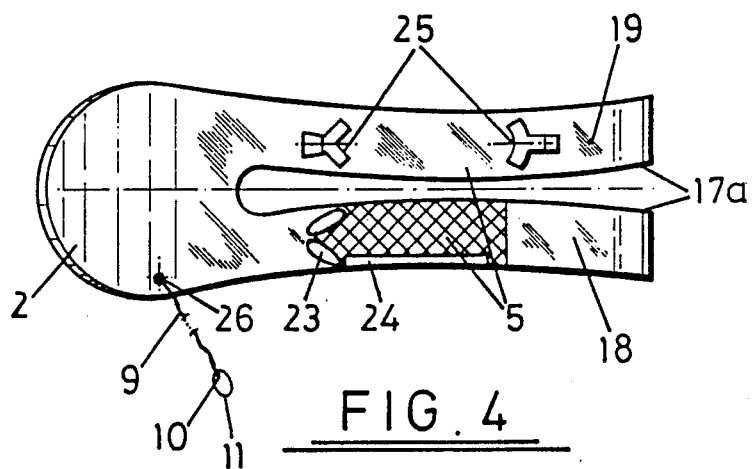
FIG. 4 is a plan view illustrating further modified embodiments with two different forms of foot engagement means.

In FIG. 4 like reference numberals have been used to indicate like parts corresponding to those of the first embodiment. The boards of FIG. 4 are generally similar to those of FIGS. 1 to 3, the principal difference being that the foot support portion surface 5 is provided with foot engagemnt means in the form of front and outer side foot stops 23, 24 respectively (left or lower side of figure) or a foot binding 25 generally similar to a ski-boot binding (right or upper side of Figure). In the latter case it is possible, as shown, to dispense with the handle means. Conveniently the handle means can be secured detachably 26 to the board to facilitate use of the board with or without handle means as desired.

Figure 6:
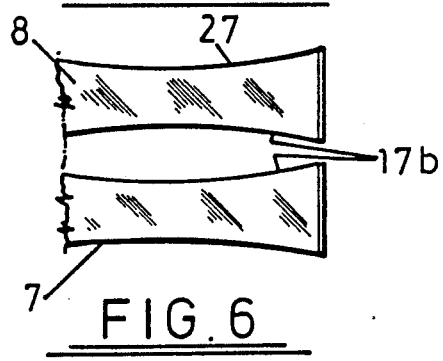
FIG. 6 is a detail plan view of a further modified embodiment.

It will be appreciated that different users may adopt different stance on the board resulting in a different weight distribution longitudinally of the board so that a different section of the outside edge may be weighted during turning more than the rest of said edges, e.g. a rearward section 27 of the outer side edge 7, 8 (see FIG. 6 which is a detail plan view of a further modified embodiment). In this case the inner side edge rear ends 17b require to converge instead of diverging as in the above-described embodiments to facilitate tracking of the weighted inner and outer side edge sections 17b, 27 in the same direction during turning.

What is claimed is:

1. A snow board suitable for use in controlled snow slope descent, said board having a generally flat elongate base, a forward portion with an upturned leading edge portion, a user support portion and a rearward portion with said user support and rearward portions being divided into at least partly independently moveable closely spaced left and right support portions extending generally alongside each other rearwardly from said forward portion and having opposed inner side edges disposed thereupon, said base having outer side edges of generally angular cross-sectional shape for biting into the surface of said snow slope during turning in use of said board, said outer side edges being concavely arcuate, in plan view, so that said board is substantially waisted intermediate its ends whereby, in use, said board can be controllably steered along an arcuate path when one of said outer edges is weighted and the other unweighted, said left and right support portions being torsionally flexible whereby during turning, in use of the board, the inner side edge at the rear end of one of said support portions can bite into said snow slope surface when the outer side edge of the other of said support portions bites into said snow slope surface, said opposed inner side edges having sections which diverge rearwardly at the rearward portion of the board so as to each extend generally parallel to the respective remote outer side edge section at the forward portion of the board so that when one said outer side edge section is weighted for turning so as to bite into and engage said snow slope surface, the respective inner side edge section also bites into and engages the snow slope surface at the same time as a result of the user's natural weight distribution on the board, said engaging outer and inner side edge sections co-operating to drive the board in a substantially similar direction.

2. A board according to claim 1 wherein an open-ended elongate slot is defined between said left and right support portions.

3. A board according to claim 1 wherein is provided an auxiliary steering means comprising handle means linked to opposed left and right hand side portions of said forward portion of the board by flexible elongate connectors formed and arranged so as to be manipulable by a user selectively to apply a generally upward force to one or other of said side portions.

4. A board according to claim 1 wherein said base is provided with shallow elongate longitudinally extending rib means.

5. A board according to claim 4 wherein said rib means comprises a pair of longitudinally extending ribs under said user support portion of the board.

6. A board according to claim 4 wherein is provided a pair of longitudinally extending ribs under the rearward portion of the board.

7. A board according to claim 4 wherein the forward portion of the board is provided with a central longitudinally extending rib.

8. A board according to claim 1 wherein each of said left and right support portions is provided with foot engagement means.

9. A board according to claim 8 wherein said foot engagement means comprise front foot stops and outer side foot stops.

10. A board according to claim 8 wherein said foot engagement means comprise foot binding means for captively securing respective ones of a user's feet in use of the board.

11. A snow board suitable for use in controlled snow slope descent, said board having a generally flat elongate base, a forward portion with an upturned leading edge portion, a user support portion and a rearward portion with said user support and rearward portions being divided into at least partly independently moveable closely spaced left and right support portions extending generally alongside each other rearwardly from said forward portion and having opposed inner side edges disposed thereupon, said base having outer side edges of generally angular cross-sectional shape for biting into the surface of said snow slope during turning in use of said board, said outer side edges being concavely arcuate, in plan view, so that said board is substantially waisted intermediate its ends whereby, in use, said board can be controllably steered along an arcuate path when one of said outer edges is weighted and the other unweighted, said left and right support portions being torsionally flexible whereby during turning, in use of the board, the inner side edge at the rear end of one of said support portions can bite into said snow slope surface when the outer side edge of the other of said support portions bites into said snow slope surface, the inner side edge on each support section having a section which converges rearwardly at the rearward portion of the board so as to extend generally parallel to the corresponding outer side edge section on the other support section at the rearward portion of the board, whereby said inner and outer side edge sections co-operate to drive the board in substantially the same direction when said edge sections are weighted during turning.

12. A board according to claim 11 wherein an open-ended elongate slot is defined between said left and right support portions.

13. A board according to claim 11 wherein is provided an auxiliary steering means comprising handle means linked to opposed left and right hand side portions of said forward portion of the board by flexible elongate connectors formed and arranged so as to be manipulable by a user selectively to apply a generally upward force to one or other of said side portions.

14. A board according to claim 11 wherein said base is provided with shallow elongate longitudinally extending rib means.

15. A board according to claim 14 wherein said rib means comprises a pair of longitudinally extending ribs under said user support portion of the board.

16. A board according to claim 14 wherein is provided a pair of longitudinally extending ribs under the rearward portion of the board.

17. A board according to claim 14 wherein the forward portion of the board is provided with a central longitudinally extending rib.

18. A board according to claim 11 wherein each of said left and right support portions is provided with foot engagement means.

19. A board according to claim 18 wherein said foot engagement means comprise front foot stops and outer side foot stops.

20. A board according to claim 18 wherein said foot engagement means comprise foot binding means for captively securing respective ones of a user's feet in use of the board.

* * * * *